(12) United States Patent
Moriya et al.

(10) Patent No.: US 9,866,527 B2
(45) Date of Patent: Jan. 9, 2018

(54) INFORMATION PROCESSING DEVICE AND INFORMATION PROCESSING METHOD

(71) Applicants: Tomokazu Moriya, Tokyo (JP); Hideki Goto, Tokyo (JP); Koji Yura, Yokohama (JP)

(72) Inventors: Tomokazu Moriya, Tokyo (JP); Hideki Goto, Tokyo (JP); Koji Yura, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 188 days.

(21) Appl. No.: 14/765,937

(22) PCT Filed: Jan. 16, 2014

(86) PCT No.: PCT/JP2014/000202
§ 371 (c)(1),
(2) Date: Aug. 5, 2015

(87) PCT Pub. No.: WO2014/129107
PCT Pub. Date: Aug. 28, 2014

(65) Prior Publication Data
US 2015/0372975 A1 Dec. 24, 2015

(30) Foreign Application Priority Data
Feb. 25, 2013 (JP) .................................. 2013-034611

(51) Int. Cl.
*G06F 9/00* (2006.01)
*G06F 15/16* (2006.01)
(Continued)

(52) U.S. Cl.
CPC ...... *H04L 63/0209* (2013.01); *B61L 15/0018* (2013.01); *B61L 27/0005* (2013.01);
(Continued)

(58) Field of Classification Search
CPC . H04L 63/02; H04L 63/0209; H04L 63/0218; H04L 63/0281; H04L 2209/84;
(Continued)

(56) References Cited

U.S. PATENT DOCUMENTS 6,314,351 B1  11/2001  Chutorash
8,848,608 B1 *  9/2014  Addepalli ............. H04W 4/046
                                                                 370/328
(Continued)

FOREIGN PATENT DOCUMENTS

GB        2430585 A    3/2007
JP     2002-077174 A   3/2002
(Continued)

*Primary Examiner* — Jayesh Jhaveri
(74) *Attorney, Agent, or Firm* — Oliff PLC

(57) ABSTRACT

An information processing device is connected to a plurality of networks and performs information processing. The networks include a control network connected to a control device in a mobile object, an information network connected to an information device in the mobile object, and an external network connected to an external device outside of the mobile object. The information processing device includes firewalls each connected to one of the networks, and a processor connected to each network via the corresponding firewall. The information processing device isolates at least the control network from the other networks.

11 Claims, 9 Drawing Sheets

(51) Int. Cl.
    *G06F 17/00*     (2006.01)
    *H04L 29/06*     (2006.01)
    *B61L 15/00*     (2006.01)
    *B61L 27/00*     (2006.01)
    *B60K 31/00*     (2006.01)
    *H04L 29/08*     (2006.01)

(52) U.S. Cl.
    CPC .......... *H04L 63/0281* (2013.01); *B60K 31/00* (2013.01); *H04L 63/02* (2013.01); *H04L 63/0218* (2013.01); *H04L 67/12* (2013.01); *H04L 2209/84* (2013.01)

(58) Field of Classification Search
    CPC . H04L 12/46; H04L 12/4625; H04L 41/0893; B60K 31/00; G06F 9/00; G06F 15/16; G06F 17/00
    See application file for complete search history.

(56) References Cited

U.S. PATENT DOCUMENTS

| | | | | |
|---|---|---|---|---|
| 2003/0046587 | A1* | 3/2003 | Bheemarasetti | H04L 63/0272 726/4 |
| 2003/0065432 | A1* | 4/2003 | Shuman | B60K 31/0008 701/48 |
| 2005/0125669 | A1 | 6/2005 | Stewart et al. | |
| 2008/0219274 | A1* | 9/2008 | Kato | H04L 12/4625 370/401 |
| 2009/0045910 | A1* | 2/2009 | Zoller | G06Q 10/087 340/5.8 |
| 2009/0300750 | A1* | 12/2009 | Chou | H04L 63/029 726/12 |
| 2012/0116633 | A1 | 5/2012 | Kato et al. | |
| 2012/0218412 | A1* | 8/2012 | Dellantoni | G01C 21/3602 348/148 |
| 2013/0145482 | A1* | 6/2013 | Ricci | G06F 9/54 726/28 |
| 2013/0200991 | A1* | 8/2013 | Ricci | G08C 19/00 340/4.3 |
| 2013/0212659 | A1* | 8/2013 | Maher | H04L 63/06 726/6 |
| 2014/0192708 | A1* | 7/2014 | Wise | H04B 7/18513 370/316 |
| 2014/0207338 | A1* | 7/2014 | Healey | G06F 7/00 701/45 |

FOREIGN PATENT DOCUMENTS

| | | |
|---|---|---|
| JP | 2002-261790 A | 9/2002 |
| JP | 2002-290409 A | 10/2002 |
| JP | 2005-343430 A | 12/2005 |
| JP | 2008-227798 A | 9/2008 |
| JP | 2009-290861 A | 12/2009 |
| JP | 2012-010022 A | 1/2012 |
| KR | 20030046635 A | 6/2003 |
| WO | 00/09363 A1 | 2/2000 |

* cited by examiner

INFORMATION PROCESSING DEVICE AND INFORMATION PROCESSING METHOD

TECHNICAL FIELD

The present disclosure relates to an information processing device that processes information transmitted between a plurality of networks mounted on a mobile object such as an automobile. The disclosure also relates to an information processing method.

BACKGROUND ART

As is well known, many electronic control units are mounted on an automobile such as electronic control units to electronically control various types of on-board devices such as an engine and a brake, electronic control units for controlling devices such as meters indicating various conditions of a vehicle, and electronic control units forming a navigation system. In the automobile, these electronic control units are connected through communication lines in a way that allows communication there between, thereby forming in-vehicle networks. Various types of data is transmitted and received to and from each electronic control unit through the in-vehicle networks.

The in-vehicle networks include one connected to an electronic control unit responsible for control of the engine or the brakes, for example. Such an in-vehicle network is required to have a particularly high level of security. However, this in-vehicle network has originally been designed on the assumption that it is isolated from external networks, so that it has not had a sufficient level of security against access from external devices. Hence, an on-board communication system capable of ensuring the security of an in-vehicle network against connection with an external device has been suggested conventionally. Patent Document 1 describes an example of this system.

The system described in Patent Document 1 is an on-board communication system that realizes data communication between an outside-vehicle power line communication line and an in-vehicle network. The system includes security means, which is an information processing device that determines whether data communication between the outside-vehicle power line communication line and the in-vehicle network is permitted, and an electronic control unit connected to the in-vehicle network. In this communication system, if the security means permits data communication, data is communicated between the outside-vehicle power line communication line and the in-vehicle network via the electronic control unit. Specifically, determination made by the security means as to whether communication from an external network to the in-vehicle network is permitted ensures the security of the in-vehicle network.

CITATION LIST

Patent Literature

PLT 1

Patent Document 1: Japanese Laid-Open Patent Publication No. 2012-10022

SUMMARY OF INVENTION

Technical Problem

Demands for collaboration between in-vehicle networks and external devices have been on the growing increase in recent years. As a specific example thereof, there is an increasing demand for providing vehicular information the in-vehicle network is holding to external devices through an external network or the like. The in-vehicle network has been required to provide more types of information in response to information processing performed in a wider variety of ways by external devices. This means that providing more pieces of information in response to requests from external devices can receive more services offered by the external devices according to the quantity of information provided to the external devices. The communication system of Patent Document 1 permits many communications in response to a request from external devices. However, permitting many communications in turn might reduce the security of the in-vehicle networks.

It is an objective of the present disclosure to ensure the security of a network inside a mobile object favorably against an external network outside the mobile object while permitting communication with the external network.

Solution to Problems

In accordance with one aspect of the present disclosure, an information processing device connected to a plurality of networks and performing information processing is provided. The networks includes a control network connected to a control device in a mobile object, an information network connected to an information device in the mobile object, and an external network connected to an external device outside of the mobile object. The information processing device includes firewalls each connected to one of the networks, and a processor connected to each network via the corresponding firewall. The information processing device is configured to isolate at least the control network from the other networks.

In accordance with another aspect of the present invention, an information processing method implemented in an information processing device is provided. The information processing device is connected to a plurality of networks and performs information processing. The networks includes a control network connected to a control device in a mobile object, an information network connected to an information device in the mobile object, and an external network connected to an external device outside of the mobile object. A firewall is connected to each of the networks. A processor is connected to each network via the corresponding firewall. The information processing method includes isolating at least the control network from the other networks.

In the aforementioned configuration or method, the control network is isolated from the external network connected for example to the Internet or an information terminal. The control network is further isolated from the information network connected to an information device such as a navigation system or an audio system. This ensures the security of the control network favorably to and from which control information important for travel of the mobile object is transferred.

The processor is connected to each network via the corresponding firewall. Thus, information in the control network can be transmitted to a different network via the processor while the control network is not accessed directly from the different network.

This ensures the security of the control network favorably against the external network for example while the control network can communicate with a different network.

The external network makes the processor intervene in acquisition of information from the control network. Thus, even communication messages not conforming to the protocol of the control network still allow the external network to acquire information in the control network.

If the mobile object is a vehicle, the mobile object is generally provided with at least three networks having different required security levels from each other, specifically the control network, the information network, and the external network. Thus, in the vehicle, different firewalls are prepared for the control network required to be at a high security level, the information network of a security level not required to be as high as that of the control network, and the external network finding difficulty in ensuring its security. As a result, a security level that should be ensured in each network can be determined appropriately.

In accordance with a preferable configuration, each firewall is configured to permit communication only between the processor and the network to which the firewall is connected. The processor is configured to receive, from a network except the control network, a request signal that requests control information about the control device, and the control information is acquired from the control network. The processor is configured to acquire from the control network the control information requested in the request signal. The processor is configured to generate a response signal responsive to the request signal, and the response signal contains the acquired control information. The processor is configured to transmit the response signal to the network that is the transmission source of the request signal.

In accordance with a preferable information processing method includes: making each firewall permit communication only between the processor and the network to which the firewall is connected; making the processor receive, from the other network, a request signal that requests control information about the control device, wherein the control information is acquired from the control network; making the processor acquire the control information requested in the request signal from the control network; making the processor generate a response signal responsive to the request signal by incorporating the acquired control information in the response signal; and making the processor transmit the response signal to the network that is the transmission source of the request signal.

In the aforementioned configuration or method, a request signal from the external network or the information network does not flow into the control network directly but it is processed in a predetermined way by the processor. This favorably maintains the security at least of the control network. If the mobile object is a vehicle, for example, the processor acquires vehicular information such as vehicle speed information or sensor information in the control network based on a request signal, and generates a response signal responsive to the request signal and containing the vehicular information. Thus, even if a request signal from a different network does not flow into the control network, the information requested in the request signal is still transmitted in the response signal to a transmission source of the request signal in the different network.

A request signal received for example from the external network is processed by the processor. This does not require the request signal to conform to the protocol of the control network for example in the external network. Thus, the external network and the information network can acquire control information in the control network easily.

In accordance with a preferable configuration, the processor is configured to acquire the control information from the control network each time the request signal is received from the external network or the information network. According to this configuration, each time a request signal is received from the external network, for example, control information is acquired from the control network. It is therefore possible to increase the real-time correspondence of the control information to the received request signal.

In accordance with a preferable configuration, the processor includes a storage that stores the control information acquired from the control network, and the processor is configured to incorporate the stored control information into the response signal.

According to this configuration, a response signal responsive to a request signal received from the external network or the information network is generated based on control information acquired from the control network and stored in the storage. This shortens the time to elapse before a response signal generated in response to a received request signal is transmitted, thereby enhancing the responsiveness of the response signal to the request signal.

In accordance with a preferable configuration, the processor includes a proxy server that changes a transmission destination of the received request signal, and a data server that generates a response signal responsive to the received request signal. The proxy server is configured to change a transmission destination of the received request signal to the data server. The data server is configured to receive the request signal the transmission destination of which has been changed by the proxy server. The data server is configured to acquire the control information requested in the received request signal. The data server is configured to generate the response signal containing the acquired control information.

According to this configuration, a request signal for example from the external network once enters the proxy server. This keeps information about a transmission destination of the request signal in the control network hidden from the external network. As a result, the security of the control network is ensured at a higher level.

The data server is responsible for process on a request signal. Thus, even if a request signal for example from the external network is not transmitted to the control network, a response signal responsive to the request signal can be generated. This also maintains the control network at a high level of security.

In accordance with a preferable configuration, the processor includes an authenticating unit that authenticates a device that has transmitted the request signal, and the processor is configured to acquire control information requested only in a request signal transmitted from a device authenticated by the authenticating unit.

According to this configuration, the processor performs a process of acquiring control information in response only to a request signal transmitted from an authenticated device. Thus, control information in the control network is prevented from being acquired improperly by an unauthenticated device. This can also maintain the control network at a high level of security.

In accordance with a preferable configuration, the processor includes a monitoring unit that monitors the request signal based on a monitoring condition. When determining that "an abnormality has occurred in the request signal" as a result of monitoring based on the monitoring condition, the monitoring unit is configured to prohibit the processor from acquiring the control information.

According to this configuration, if the presence of an abnormality in a request signal is determined as a result of monitoring, acquisition of control information based on the request signal is prohibited. This also contributes to enhancement of the security of the control network.

In accordance with a preferable configuration, the processor includes a log unit that stores the request signals chronologically.

According to this configuration, a request signal is stored as log data chronologically or statistically. Thus, the presence or absence of an abnormal request signal caused for example by attack from the external network can be determined. This can manage the communication system favorably mounted on the mobile object while contributing to further enhancement of the security of the control network.

In accordance with a preferable configuration, the processor is configured to acquire, in response to the request signal requesting acquisition of a plurality of pieces of control information, the pieces of control information requested in the request signal one by one successively from the control network. The processor is configured to repeat generation of the response signal while incorporating the acquired pieces of control information in order in the response signal.

According to this configuration, the processor can appropriately handle the case where a request signal from the external network requests a plurality of successive pieces of control information, for example. Specifically, the processor can generate a response signal responsive to a request signal while incorporating a plurality of pieces of control information in the response signal in order stored chronologically in an appropriate storage. The processor may also generate a response signal containing pieces of vehicular information composed for example of pieces of information appearing at short intervals or divided pieces of information that are stored in the order in which they are acquired from the control network. It is therefore possible to respond to a request for acquisition of a plurality of pieces of control information while maintaining the control network at a high level of security.

In accordance with a preferable configuration, a protocol converter is provided between the control network and the firewall connected to the control network. The protocol converter is configured to convert a communication protocol of the request signal processed by the processor to a communication protocol of the control network.

In many cases, the communication protocol of a control network of a mobile object differs from that of an external network. According to the configuration described above, even if the communication protocol of a control network differs from that of an external network, the communication protocol of a request signal input from the external network and processed by the processor is converted to the communication protocol of the control network. This allows the external network and the control network to transmit information to and from each other appropriately.

In accordance with a preferable configuration, the processor is configured to receive, from the information network, setting data relating to setting of a device in the control network. The processor is configured to generate, based on the setting data, a transmission signal to be transmitted to the control network.

The information network mounted on the mobile object such as a vehicle is generally maintained at a security level higher than that of the external network. This configuration allows the information network to transmit setting data to a device in the control network. As a result, the control device connected to the control network can be managed easily while the security of the control network against the external network is maintained.

In accordance with a preferable configuration, the processor is configured to authenticate a transmission source of a request signal received from the information network. The processor is configured to acquire control information requested in the request signal from the control network. The processor is configured to generate a response signal while incorporating the acquired control information in the response signal and to transfer the response signal to the authenticated transmission source in the information network.

According to this configuration, the processor transfers to the authenticated transmission source in the information network the response signal generated by incorporating the control information acquired from the control network. This reduces a processing load on the processor while allowing a device in the information network to acquire control information in the control network easily and promptly.

DESCRIPTION OF EMBODIMENTS

FIGS. 1 to 9 describe an information processing device according to one embodiment and an example of a communication system including the information processing device.

Figure 1:
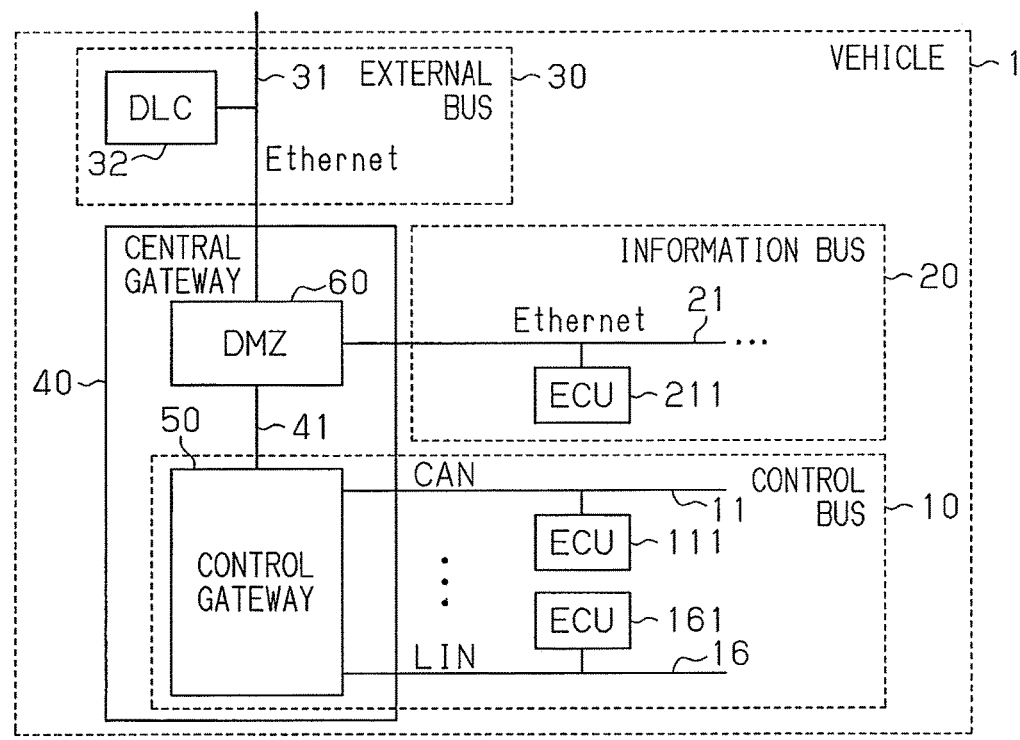
FIG. 1 is a block diagram schematically showing an information processing device according to one embodiment and an exemplary structure of a communication system including the information processing device.

FIG. 1 describes an outline of the communication system.

As shown in FIG. 1, a mobile object, which is a vehicle 1, includes a plurality of communication networks provided inside the vehicle. The communication networks are connected to electronic control units (ECUs) and the like of the vehicle 1 in a way that allows communication there between. The communication networks include a control bus 10 functioning as a control network, an information bus 20 functioning as an information network, and an external bus 30 functioning as an external network. The control bus 10 is a network connected to ECUs and the like responsible for control relating to traveling, steering or stop of the vehicle 1. Thus, the control bus 10 is required to have a high level of reliability and safety, specifically a high level of security. In this embodiment, the control bus 10 includes a plurality of communication buses (such as a bus 11 and a bus 16). The information bus 20 is a network connected to an ECU and the like such as a navigation system or an audio system. The information bus 20 is also required to have security of a high level but this level is not required to be as high as that required for the control bus 10. The external bus 30 is a network that can be connected via a data link connector (DLC) 32 and the like to an on-board diagnostic (OBD) unit, an external device of any type or an external network such as the Internet. Specifically, the external bus 30 is open to outside of the vehicle 1. Hence, the external bus 30 finds difficulties in maintaining security at a constant level so that it inherently becomes lower in security level than the control bus 10 or the information bus 20.

The vehicle 1 includes a central gateway 40 connected to the control bus 10, the information bus 20, and the external bus 30. The central gateway 40 is a unit having various functions of controlling communication between the control bus 10, the information bus 20, and the external bus 30 made by communication messages.

The central gateway 40 includes a control gateway 50. The control gateway 50 relays communication messages between the communication buses (such as the buses 11 and 16) in the control bus 10 and relays communication messages to be input and output to and from the control bus 10. The control gateway 50 forms part of the control bus 10. The central gateway 40 includes what is called a demilitarized zone (DMZ) 60, which is a network area having various functions to ensure security. The demilitarized zone 60 ensures the security of the control bus 10 and that of the information bus 20 against the external bus 30. The information bus 20 and the external bus 30 are both connected to the demilitarized zone 60 in a way that allows communication of the information bus 20 and the external bus 30. The control bus 10 is connected through a communication bus 41 to the demilitarized zone 60 in a way that allows communication of the control bus 10. While regulating transmission of communication messages between the control bus 10, the information bus 20 and the external bus 30 connected to the demilitarized zone 60, the demilitarized zone 60 controls communication in a way that transmits only the contents of information contained in communication messages, thereby ensuring a high level of security of the control bus 10 and that of the information bus 20. As an example, the control bus 10 is designed not to receive communication messages from the information bus 20 or the external bus 30, so that the control bus 10 is isolated from the information bus 20 and the external bus 30 in terms of transmission of communication messages. Likewise, the information bus 20 is isolated from the external bus 30 in terms of transmission of communication messages. Specifically, the demilitarized zone 60 cuts off transmission of communication messages to the control bus 10 from the information bus 20 or the external bus 30 as a transmission source forming a network except the control bus 10. This imposes a limit on direct access to the control bus 10 from the information bus 20 and the external bus 30. In this way, the demilitarized zone 60 isolates the control bus 10 from the information bus 20 and the external bus 30 forming networks except the control bus 10. In this embodiment, a communication line conforming to the Ethernet (registered trademark) standard is connected to the demilitarized zone 60 and the Internet Protocol (IP) is used for communication. Specifically, the control bus 10, the information bus 20, and the external bus 30 are connected through the Ethernet (registered trademark) to the demilitarized zone 60, and make communication with the demilitarized zone 60 via the Internet Protocol.

The communication system will now be described in detail next.

Figure 2:
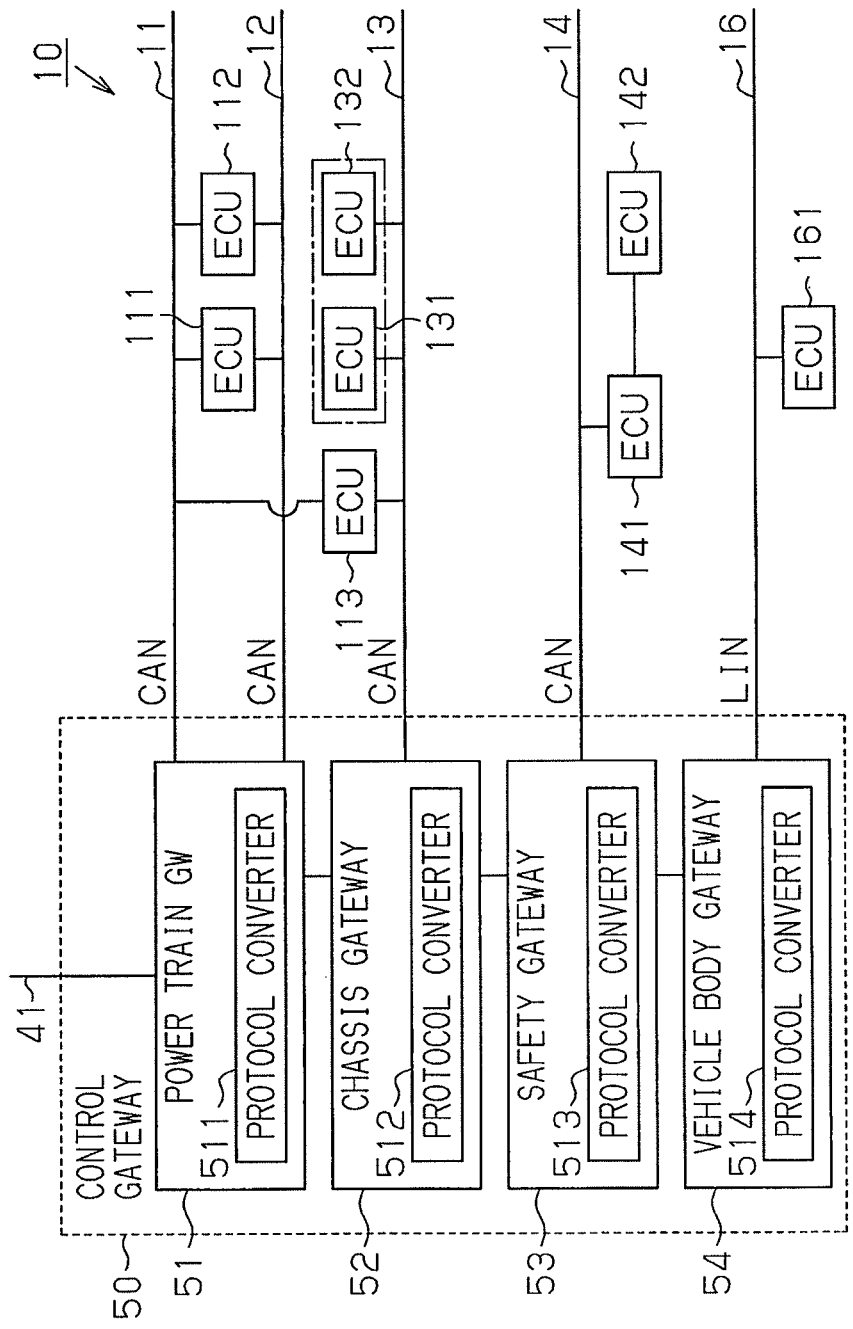
FIG. 2 is a block diagram schematically showing the structure of a control bus of FIG. 1.

As shown in FIG. 2, the control bus 10 includes the control gateway 50 mentioned above, and a plurality of bus networks connected to the control gateway 50. The control gateway 50 is connected through the communication bus 41 conforming to the Ethernet (registered trademark) standard to the demilitarized zone 60 in a way that allows communication of the control gateway 50. The control gateway 50 includes a power train gateway (power train GW) 51, a chassis gateway 52, a safety gateway 53, and a vehicle body gateway 54. The power train gateway 51, the chassis gateway 52, the safety gateway 53, and the vehicle body gateway 54 are connected to the communication bus 41 in a way that allows communication of these gateways. This allows communication between the power train gateway 51, the chassis gateway 52, the safety gateway 53, and the vehicle body gateway 54 through the communication bus 41. The control bus 10 further includes as a plurality of communication buses first to fourth CAN (controller area network) buses 11 to 14, and a LIN (local interconnect network) bus 16.

The power train gateway 51, the chassis gateway 52, and the safety gateway 53 each include a CAN controller (not shown) that allows communication via the CAN protocol. These gateways are connected to the first to fourth CAN buses 11 to 14 corresponding to CAN controllers. Specifically, the first and second CAN buses 11 and 12 are connected to the power train gateway 51 in a way that allows communication through the first and second CAN buses 11 and 12. The third CAN bus 13 is connected to the chassis gateway 52 in a way that allows communication through the third CAN bus 13. The fourth CAN bus 14 is connected to the safety gateway 53 in a way that allows communication through the fourth CAN bus 14.

The vehicle body gateway 54 includes a local interconnect network controller (not shown) that allows communication via the local interconnect network protocol. The vehicle body gateway 54 is connected through the local interconnect network bus 16 to the local interconnect network controller in a way that allows communication of the vehicle body gateway 54.

The power train gateway 51, the chassis gateway 52, and the safety gateway 53 include a protocol converter 511, a protocol converter 512, and a protocol converter 513, respectively. The protocol converters 511 to 513 convert the Internet Protocol used for communication through the communication bus 41 and the CAN protocol used for communication through the first to fourth CAN buses 11 and 14 to each other. This enables the CAN buses 11 to 14 and the communication bus 41 to communicate with each other via the gateways 51 to 53 in the form of transfer of communication messages, for example. The power train gateway 51 can transfer communication messages via the CAN protocol between the two CAN buses 11 and 12.

The vehicle body gateway 54 includes a protocol converter 514. The protocol converter 514 converts the Internet Protocol used for communication through the communication bus 41 and the local interconnect network protocol used for communication through the local interconnect network bus 16 to each other. This further enables the local interconnect network bus 16 and the communication bus 41 to communicate with each other via the vehicle body gateway 54 in the form of transfer of communication messages, for example.

The power train gateway 51, the chassis gateway 52, the safety gateway 53, and the vehicle body gateway 54 can communicate with each other via communication messages converted to the Internet Protocol by the corresponding protocol converters 511 to 514.

The first to fourth CAN buses 11 to 14 are configured as CAN networks so that they employ the CAN protocol as a communication protocol. Each of the first to fourth CAN buses 11 to 14 is composed for example of a communication line such as a twisted cable, and transmits through the communication line communication messages forming communication units of the CAN protocol, which provides multi-master communication. A communication path of each of the first to fourth CAN buses 11 to 14 may include a path for wireless communication or may include a path passing through a different network via a gateway, for example.

The local interconnect network bus 16 is configured as a local interconnect network so that it employs the local interconnect network protocol as a communication protocol. The local interconnect network bus 16 is composed for example of a communication line such as a single cable, and transmits through the communication line communication messages via the local interconnect network protocol that provides master-slave communication based on a time schedule. A communication path of the local interconnect network bus 16 may also include a path for wireless communication or may include a path passing through a different network via a gateway, for example.

Various electronic control units (ECUs) 111 to 113, 131, 132, 141, 142 and 161 are connected to the first to fourth CAN buses 11 and 14 and the local interconnect network bus 16. The ECUs (such as ECU 111) each include an information processor (not shown) that performs a process necessary for various controls, and a communication controller (not shown) that transmits and receives communication messages via a protocol responsive to a communication bus connected to this ECU.

The ECUs 111 to 113, 131, 132, 141 and 142 connected to the first to fourth CAN buses 11 to 14 are controllers used for various controls of the vehicle 1. Each ECU holds vehicular information as control information used for controlling the vehicle. Each ECU can output the vehicular information the ECU is holding as communication messages to a communication bus connected to this ECU. Each ECU is an ECU to control a driving system, a traveling system, a chassis system, or a safety system, for example. An ECU to control a driving system is an ECU for an engine, for example. An ECU to control a traveling system is an ECU for steering or an ECU for a brake, for example. An ECU to control a chassis system is an ECU for a light or an ECU for a direction indicator, for example. An ECU to control a safety system is an ECU for an ABS (antilock brake system) or an ECU for collision prevention, for example. In this way, the ECUs responsible for significant controls relating to traveling, steering and stop of the vehicle 1 are connected to the first to fourth CAN buses 11 to 14. In this embodiment, the ECUs 111 and 112 are both connected to each of the first and second CAN buses 11 and 12 in a way that allows communication of the ECUs 111 and 112. The ECU 113 is connected to each of the first and third CAN buses 11 and 13 in a way that allows communication of the ECU 113. The two ECUs 131 and 132 housed in one device are both connected to the third CAN bus 13 in a way that allows the ECUs 131 and 132 to communicate. The ECU 141 is connected to the fourth CAN bus 14 in a way that allows communication of the ECU 141 while being connected to the ECU 142 in a way that allows communication there between.

The ECU 161 connected to the local interconnect network bus 16 is a controller used for various controls of the vehicle 1. The ECU 161 holds vehicular information as control information used for controlling the vehicle. The ECU 161 can output the vehicular information the ECU 161 is holding as communication messages to the local interconnect network bus 16 connected to the ECU 161. The ECU 161 is an ECU to control a vehicle body system. An ECU to control a vehicle body system is an ECU for a mirror or an ECU for a window, for example. Specifically, the ECU connected to the local interconnect network bus 16 relates to control of a device that might affect the operation of the vehicle 1.

Figure 3:
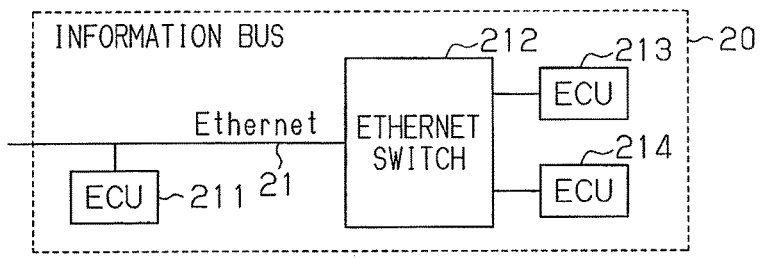
FIG. 3 is a block diagram schematically showing the structure of an information bus of FIG. 1.

As shown in FIG. 3, the information bus 20 includes a communication bus 21 conforming to the Ethernet (registered trademark) standard. The information bus 20 is connected in a way that allows communication through the communication bus 21 with the demilitarized zone 60 via the Internet Protocol. The communication bus 21 is connected to an ECU 211 and to two ECUs 213 and 214 via an Ethernet switch 212. The Ethernet switch 212 is a switching hub that allocates communication messages from the demilitarized zone 60 through the communication bus 21 to an ECU (213 or 214) as a transmission destination of the communication messages. Accordingly, the Ethernet switch 212 relieves congestion in communication through communication lines connecting the Ethernet switch 212 and the two ECUs 213 and 214.

Each of the ECUs 211, 213 and 214 connected to the information bus 20 is an ECU used in an information device of any type of the vehicle 1. Each of the ECUs 211, 213 and 214 is an ECU to control an information device system such as a navigation system or an audio system. Specifically, the ECU connected to the information bus 20 relates to control of a device that guides a traveling route for the vehicle 1 or maintains comfort inside the vehicle. Each of the ECUs 211, 213 and 214 are capable of outputting communication messages requesting vehicular information, specifically request signals to an ECU in the control bus 10.

As shown in FIG. 1, the external bus 30 includes a communication bus 31 conforming to the Ethernet (registered trademark) standard. The external bus 30 is connected through the communication bus 31 to the demilitarized zone 60 in a way that allows communication with the demilitarized zone 60 via the Internet Protocol. The data link connector (DLC) 32 on the communication bus 31 is a connector that connects an external device to the network of the vehicle 1 in a way that allows communication of the external device. The DLC 32 is capable of connecting an external device such as an on-board diagnostic (OBD) unit or an information terminal such as a smartphone in a way that allows communication of the external device. Specifically, the external device connected to the data link connector 32 can transmit communication messages to the control bus 10 or the information bus 20 via the data link connector 32. The communication messages that can be transmitted in this way include a communication message as a request signal requesting vehicular information from an ECU in the control bus 10. In this embodiment, the central gateway 40 receives communication messages input via the data link connector 32 and performs a process based on the communication messages. Specifically, the communication messages input from the external bus 30 does not flow into the control bus 10 or the information bus 20 directly or is not transferred as it is.

A device conforming to the Ethernet (registered trademark) standard such as a wireless communication unit 33 (see FIG. 5) can be connected to the communication bus 31 without intervention of the data link connector 32. In this way, the external bus 30 is open to communications from outside of the vehicle 1, and is used for connection to an external device via the data link connector 32 or a wireless communication device and for connection to a network outside the vehicle such as the Internet. This causes a conventional problem in that the security of the external bus 30 is hard to manage in the vehicle 1. In response, in this embodiment, the security of the control bus 10 and that of the information bus 20 against the external bus 30 are maintained by the intervention of the demilitarized zone 60.

Figure 4:
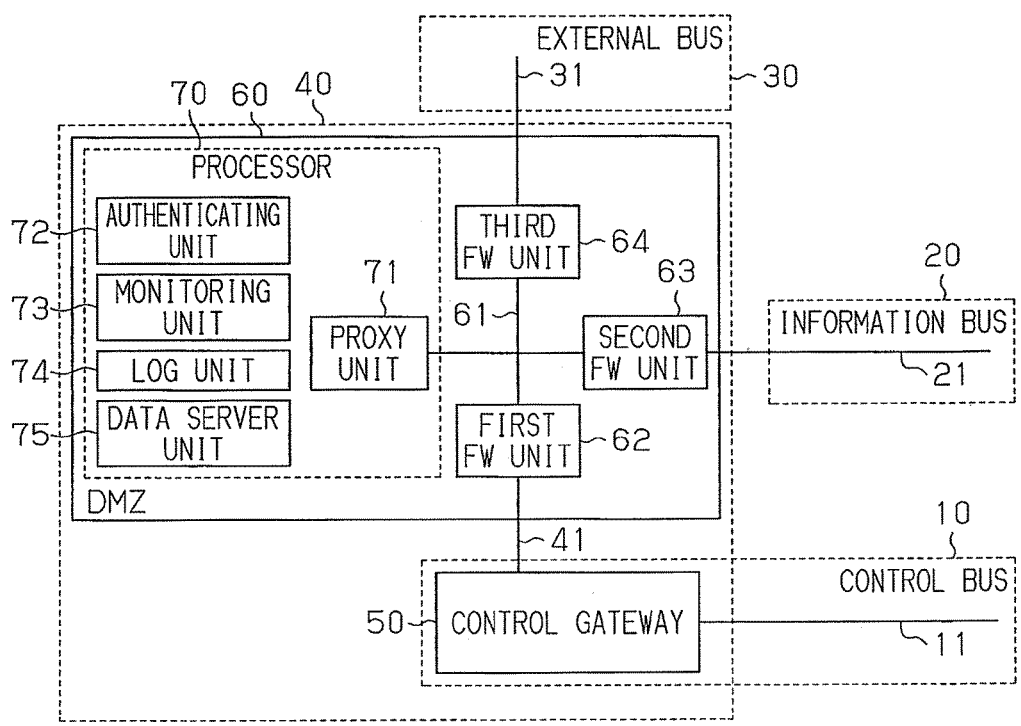
FIG. 4 is a block diagram schematically showing the structure of a demilitarized zone (DMZ) of FIG. 1.

As shown in FIG. 4, the demilitarized zone 60 includes an internal bus 61 through which communication messages of the Internet Protocol (IP) flow, and first to third firewall (FW) units 62 to 64 connected to the internal bus 61. The demilitarized zone 60 includes a processor 70 that performs various processes on communication messages flowing through the internal bus 61. The demilitarized zone 60 ensures the security of the control bus 10 and that of the information bus 20 as a result of the various processes performed in the processor 70.

The first firewall unit 62 is provided between the internal bus 61 and the control bus 10. The second firewall unit 63 is provided between the internal bus 61 and the information bus 20. The third firewall unit 64 is provided between the internal bus 61 and the external bus 30. The first to third firewall units 62 to 64 determine whether passage of communication messages such as a request signal is permitted based on if the address of a transmission source or a transmission destination contained in the communication messages fulfills a corresponding predetermined regulatory-condition, thereby regulating communication. Based on the regulatory condition, the first firewall unit 62 permits communication messages to pass between the internal bus 61 and the control bus 10 while preventing communication messages from the information bus 20 or the external bus 30 from flowing into the control bus 10 through the internal bus 61. Based on the regulatory condition, the second firewall unit 63 permits communication messages to pass between the internal bus 61 and the information bus 20 while preventing communication messages from the control bus 10 or the external bus 30 from flowing into the information bus 20 through the internal bus 61. Based on the regulatory condition, the third firewall unit 64 permits communication messages to pass between the internal bus 61 and the external bus 30 while preventing communication messages from the control bus 10 or the information bus 20 from flowing into the external bus 30 through the internal bus 61.

The processor 70 includes a proxy unit 71 that changes a transmission destination of communication messages received as request signals to the processor 70, an authenticating unit 72 that authenticates a device as a transmission source of the request signal, and a monitoring unit 73 that monitors the communication status of the request signal. The processor 70 includes a log unit 74 that stores the communication status of the request signal chronologically or statistically. The processor 70 further includes a data server unit 75. The data server unit 75 holds vehicular information output from the ECUs 111 to 161 in the control bus 10, and generates communication messages as response signals responsive to request signals from the control bus 10, the information bus 20, and the external bus 30. The proxy unit 71 in the processor 70 and each of the first to third firewall units 62 to 64 are connected through the internal bus 61 in a way that allows communication there between. In the processor 70, the proxy unit 71 is connected to each of the authenticating unit 72, the monitoring unit 73, the log unit 74, and the data server unit 75 in a way that allows communication of the proxy unit 71. In this embodiment, all communication messages input from the first to third firewall units 62 to 64 are transmitted to the proxy unit 71 in the processor 70 through the internal bus 61.

The proxy unit 71 is what is called a proxy server. The proxy unit 71 changes a transmission destination of a request signal designating an ECU in each bus as a transmission destination to the processor 70. Thus, a request signal designating an ECU in a bus as a transmission destination is first processed by the processor 70. The proxy unit 71 determines process requested by a request signal, and asks the authenticating unit 72 or the data server unit 75 to perform the process on the signal according to the contents of the requested process. When determining that a request signal requests process relating to authentication, for example, the proxy unit 71 transmits the request signal to the authenticating unit 72 and makes the authenticating unit 72 process the signal. When determining that a request signal requests an ECU in the control bus 10 to output vehicular information, for example, the proxy unit 71 transmits the request signal to the data server unit 75 and makes the data server unit 75 process the signal. Further, the proxy unit 71 can transmit to an authenticated external device connected to the information bus 20 or the external bus 30 a response signal generated by performing certain process on communication messages received from the control bus 10. The proxy unit 71 manages information about an improper transmission source and prevents process on a request signal from the improper transmission source. As an example, the proxy unit 71 takes the action of not responding to a request signal from an improper transmission source by not processing the request signal from the improper transmission source. Further, the proxy unit 71 can update information about an improper transmission source based on a result of authentication of a transmission source by the authenticating unit 72 or a result of monitoring of communication messages by the monitoring unit 73. The proxy unit 71 makes a substitute address open to the outside different from an address for communication with an ECU in the control bus 10, thereby ensuring the security of the control bus 10 against the external bus 30.

The authenticating unit 72 has an authentication function of determining if an external device connected to the external bus 30 or an information device connected to the information bus 20 is a proper device or not based on a certain authentication condition. The authenticating unit 72 stores information registered in advance used as the authentication condition to identify an external device permitted to make communication. To start communication with an external device connected to the information bus 20 or the external bus 30, the authenticating unit 72 authenticates the external device to make communication. An applicable authentication function includes publicly known authentication functions such as SSL (Security Sockets Layer) and TLS (Transport Layer Security). The authenticating unit 72 transmits a result of authentication to the proxy unit 71. Thus, the proxy unit 71 prohibits the processor 70 from processing a request signal transmitted from a source device not having been authenticated. As a result, the processor 70 processes request signals from an external device having been authenticated by the authenticating unit 72 and generates response signals while it does not process request signals from an external device not having been authenticated by the authenticating unit 72. This prevents reduction of the security of the control bus 10 or that of the information bus 20 due to request signals from an improper external device, for example.

A request signal in a condition after authentication may be encrypted. The encrypted request signal may be decrypted by the authenticating unit 72 or may be decrypted for example by the proxy unit 71 with a key determined by the authenticating unit 72.

The authenticating unit 72 is capable of stopping authentication based on an improper request signal in response to a result of monitoring by the monitoring unit 73.

The monitoring unit 73 has a monitoring function of monitoring the behavior of a request signal received from the external bus 30 or the information bus 20 to determine the presence or absence of an abnormality in the request signal. The monitoring unit 73 has a monitoring condition used for determining if a request signal behaves improperly. The monitoring condition includes a frequency of communications or an interval between communications with which the communications are determined to be abnormal. The monitoring condition is defined for all request signals or according to the type or contents of a request signal. Specifically, the monitoring unit 73 monitors the behavior of a received request signal such as a frequency of communications or an interval between communications of the request signal according to the monitoring condition, and determines that the request signal is abnormal if the request signal falls under the monitoring condition. The monitoring unit 73 transmits a result of monitoring of a request signal to the proxy unit 71. Thus, the proxy unit 71 prohibits the processor 70 from processing a request signal determined to be abnormal. This prevents reduction of the security of the control bus 10 or that of the information bus 20 due to an abnormal request signal.

The log unit 74 stores as log data request signals received from the external bus 30 or the information bus 20. The log unit 74 may store request signals received from the external bus 30 or the information bus 20 together with temporal information or may store results of process such as statistical process. The log unit 74 analyzes the log data stored therein, and determines the presence or absence of an abnormality in request signals received from the external bus 30 or the information bus 20 based on a result of the analysis. As an example, the log unit 74 determines whether a request signal determined to be an improper request is absent in the log data. Further, the log unit 74 is capable of transmitting the log data stored therein via the external bus 30 or the information bus 20 for example to a log analyzer outside the vehicle to analyze a request signal. The analyzer outside the vehicle may be a server of a manufacture of an automobile manufacturer, for example. In this case, the presence or absence of an abnormality in a request signal received from the external bus 30 or the information bus 20 can also be determined for example by the log analyzer outside the vehicle.

The data server unit 75 analyzes a request in a request signal received from the external bus 30 or the information bus 20 and performs a process responsive to the request. The data server unit 75 is capable of generating response signals responsive to received request signals. The data server unit 75 includes a storage (not shown) that acquires vehicular information in the control bus 10 regularly from the control bus 10 and stores the acquired information. If a request signal requests vehicle speed as vehicular information in the control bus 10, for example, the data server unit 75 acquires the vehicle speed from the control bus 10 directly or from the storage indirectly storing the vehicle speed acquired from the control bus 10. The data server unit 75 generates a response signal responsive to the request and transmits the resultant response signal to a transmission source in the external bus 30.

The data server unit 75 is also capable of acquiring vehicular information in the control bus 10 from a message buffer 501 (see FIG. 6) in the control gateway 50 that temporarily stores vehicular information in the control bus 10. The data server unit 75 may transmit communication messages trying to acquire vehicular information in the control bus 10 to an ECU in the control bus 10, and then acquire the intended vehicular information in communication messages returned from the ECU.

FIGS. 5 to 9 describe the operation of the information processing device of this embodiment based on the demilitarized zone 60. To describe various operations of the demilitarized zone 60, for illustrative purposes, the control bus 10, the information bus 20, and the external bus 30 may be given structures in addition to the aforementioned structures as occasion arises.

Figure 5:
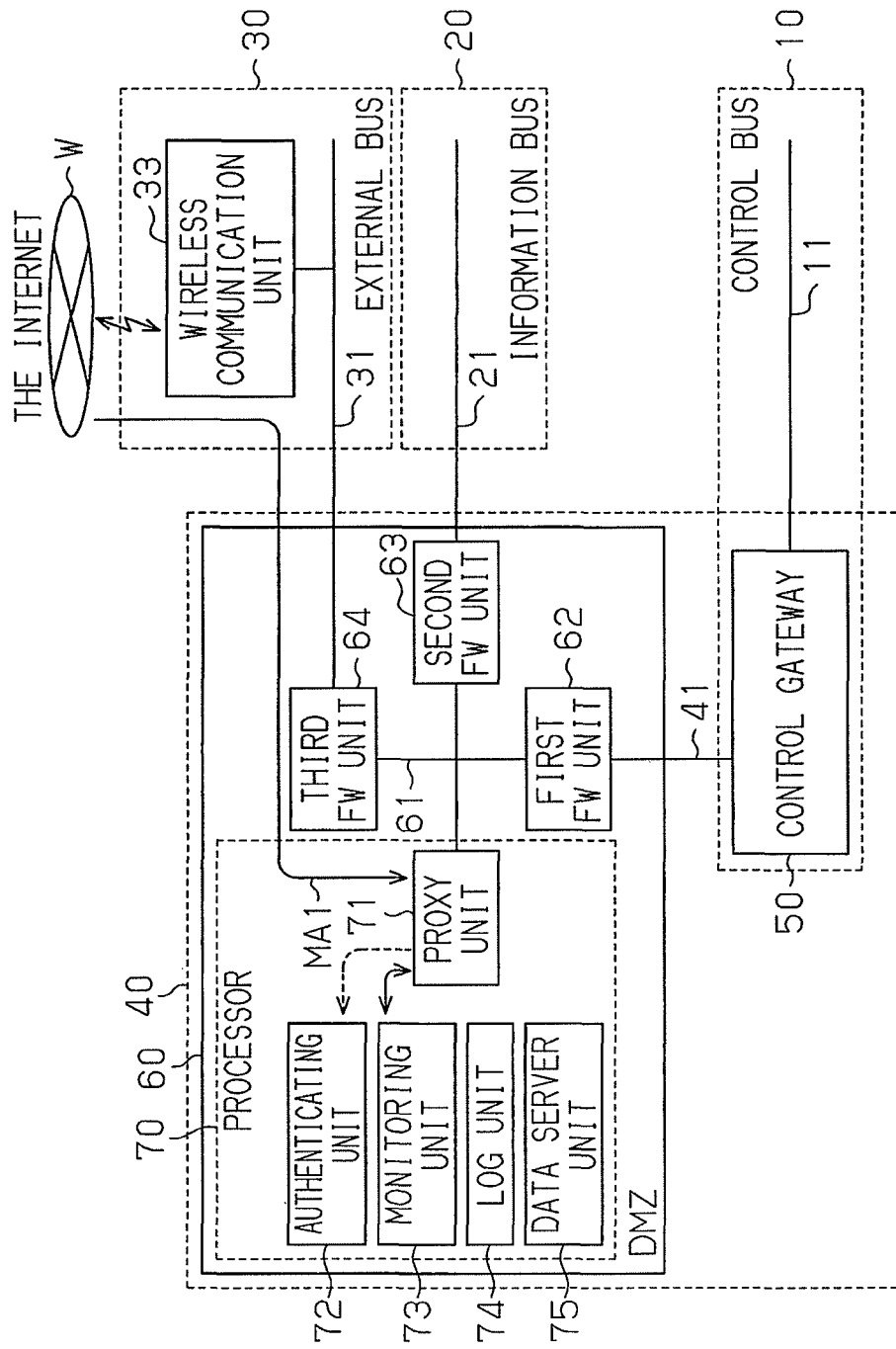
FIG. 5 is an explanatory schematic diagram showing how a transmission source of a request signal in an external bus is authenticated in the communication system of FIG. 1.

FIG. 5 shows a process performed by the processor 70 to authenticate an external device.

As shown in FIG. 5, the wireless communication unit 33 connectable to the Internet W is connected to the external bus 30. The wireless communication unit 33 is connected to the external bus 30 via the data link connector 32 or a different connector. The wireless communication unit 33 is a device that can reserve a communication path to the Internet W, and is a smartphone, a mobile phone, a slave unit of a wireless LAN or a wireless router, for example.

It is assumed that a request signal MA1 requesting start of communication with the control bus 10 is transmitted from an external device (not shown) connected to the Internet W via the external bus 30. First, the third firewall unit 64 determines whether passage of the request signal MA1 is permitted. If the passage is permitted, the request signal MA1 is transmitted to the proxy unit 71. The request signal MA1 input from the external bus 30 is prohibited from passing through the first and second firewall units 62 and 63, so that it will not be transmitted to the control bus 10 and the information bus 20. The transmitted request signal MA1 is a communication message requesting start of communication with the control bus 10. Thus, the proxy unit 71 determines that a transmission source of the request signal MA1 should be authenticated, so that it asks the authenticating unit 72 to perform authentication process. The authenticating unit 72 having been asked to perform authentication process performs authentication process to authenticate the external device as a transmission source of the request signal MA1 based on certain authentication procedure, and notifies the proxy unit 71 of a result of the authentication. If the transmission source of the request signal MA1 is authenticated, the proxy unit 71 permits the processor 70 to process the communication message transmitted from the external device. If a request signal requesting vehicular information as control information in the control bus 10 is received from the external device, for example, the proxy unit 71 asks the data server unit 75 to process the request signal. If the transmission source of the request signal MA1 is not authenticated, the proxy unit 71 prohibits the processor 70 from processing the request signal transmitted from the external device.

Each time a request signal requesting vehicular information in the control bus 10 is received from a transmission source yet to be authenticated by the authenticating unit 72, the proxy unit 71 requests the authenticating unit 72 to perform authentication process to authenticate the transmission source of the request signal. The proxy unit 71 permits the processor 70 to process the request signal requesting vehicular information on condition that the authenticating unit 72 authenticates the transmission source.

During the authentication process, the monitoring unit 73 monitors how a request signal behaves between the external device and the authenticating unit 72. If the request signal behaves normally, the monitoring unit 73 makes the authenticating unit 72 continue the authentication process. When determining that the request signal behaves suspiciously, the monitoring unit 73 makes the authenticating unit 72 stop the authentication process to authenticate the request signal. The transmission source of the request signal is not authenticated by the stop. In this case, the proxy unit 71 prohibits process even if the request signal is received from the transmission source. Specifically, the proxy unit 71 prohibits process by the processor 70.

Figure 6:
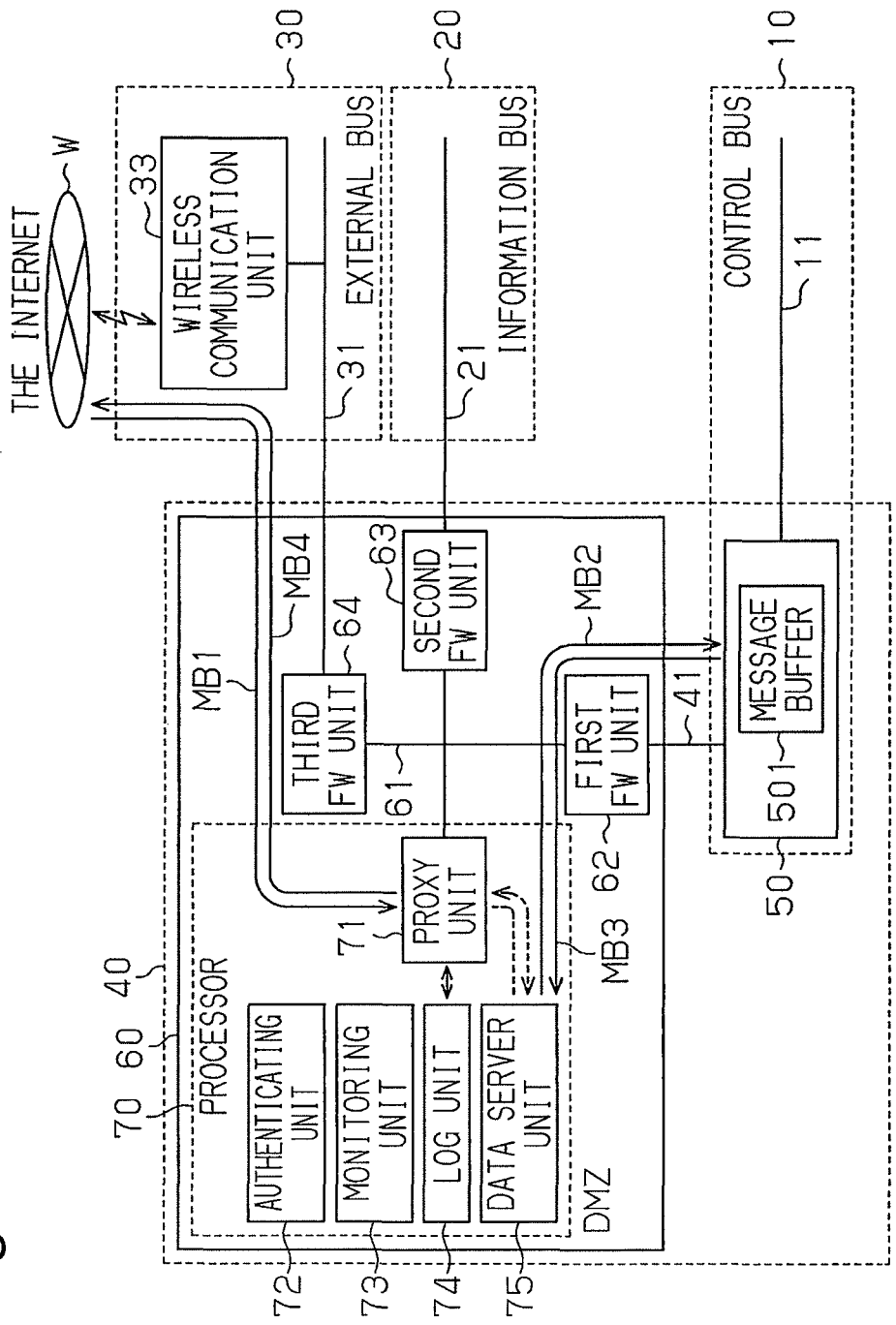
FIG. 6 is an explanatory schematic diagram showing how a response signal is transmitted to the external bus in the communication system of FIG. 1.

FIG. 6 shows a process of transmitting vehicular information in the control bus 10 in response to a request from the external device. It is assumed that the external device has been authenticated by the authentication process shown in FIG. 5.

The vehicle 1 receives a request signal MB1 requesting vehicular information from the control bus 10 transmitted from an external device (not shown) connected to the Internet W via the external bus 30. The third firewall unit 64 determines whether passage of the request signal MB1 is permitted. If the passage is permitted, the request signal MB1 is transmitted to the proxy unit 71. Based on the circumstances that the external device has been authenticated and that the request signal MB1 is communication messages requesting vehicular information in the control bus 10, the proxy unit 71 changes a transmission destination of the request signal MB1 to the data server unit 75. Specifically, the proxy unit 71 requests the data server unit 75 to process the request signal MB1.

The data server unit 75 analyzes the request signal MB1 transmitted from the proxy unit 71 and acquires the vehicular information requested in the request signal MB1. The data server unit 75 generates a communication message MB2 trying to retrieve the acquired vehicular information from the control bus 10, and transmits the generated communication message MB2 to the proxy unit 71. The proxy unit 71 transmits the received communication message MB2 to the control bus 10. The first firewall unit 62 determines whether passage of the communication message MB2 is permitted. If the passage is permitted, the communication message MB2 is input to the control gateway 50 through the communication bus 41. At this time, on condition that the communication message MB2 is a communication message from the processor 70 to the control bus 10, the first firewall unit 62 permits passage of the communication message MB2. The control gateway 50 retrieves the vehicular information from the message buffer 501 requested in the communication message MB2, generates a return communication message MB3 containing the retrieved vehicular information, and transmits the communication message MB3 to the data server unit 75. The first firewall unit 62 further determines whether passage of the communication message MB3 is permitted. If the passage is permitted, the communication message MB3 is input to the proxy unit 71 and transmitted from the proxy unit 71 to the data server unit 75. At this time, the first firewall unit 62 also permits passage of the communication message MB3 on condition that the communication message MB3 is a communication message from the control bus 10 to the processor 70.

The data server unit 75, which has received the communication message MB3, acquires vehicular information from the communication message MB3, and generates, as a message responsive to the request signal MB1 requesting the vehicular information, a response signal MB4 containing the acquired vehicular information. Specifically, the response signal MB4 is generated as a communication message that can be transmitted to the external bus 30. The data server unit 75 transmits the generated response signal MB4 to the proxy unit 71. If necessary, the proxy unit 71 processes and/or changes a transmission source or a transmission destination of the received response signal MB4. Then, the proxy unit 71 transmits the response signal MB4 to the external device as a transmission source of the request signal MB1 connected to the external bus 30. The third firewall unit 64 determines whether passage of the response signal MB4 is permitted. If the passage is permitted, the response signal MB4 is transmitted to the external bus 30. At this time, the third firewall unit 64 permits passage of the response signal MB4 on condition that the response signal MB4 is a communication message from the processor 70 to the external bus 30.

The log unit 74 acquires log data about the request signal MB1. As an example, the log unit 74 acquires log data in a period from when communication with the external device starts until when the communication ends. On condition that the communication ends, the log unit 74 analyzes the log data to determine the presence or absence of improper communication or delivers the log data to an external log analyzer. Establishment of a connection path or a connection line is considered a phenomenon indicating start of communication. Cutoff of the connection path or the connection line is considered a phenomenon indicating end of the communication. If ex-post determination is unnecessary, acquisition of log data by the log unit 74 may be omitted.

Figure 7:
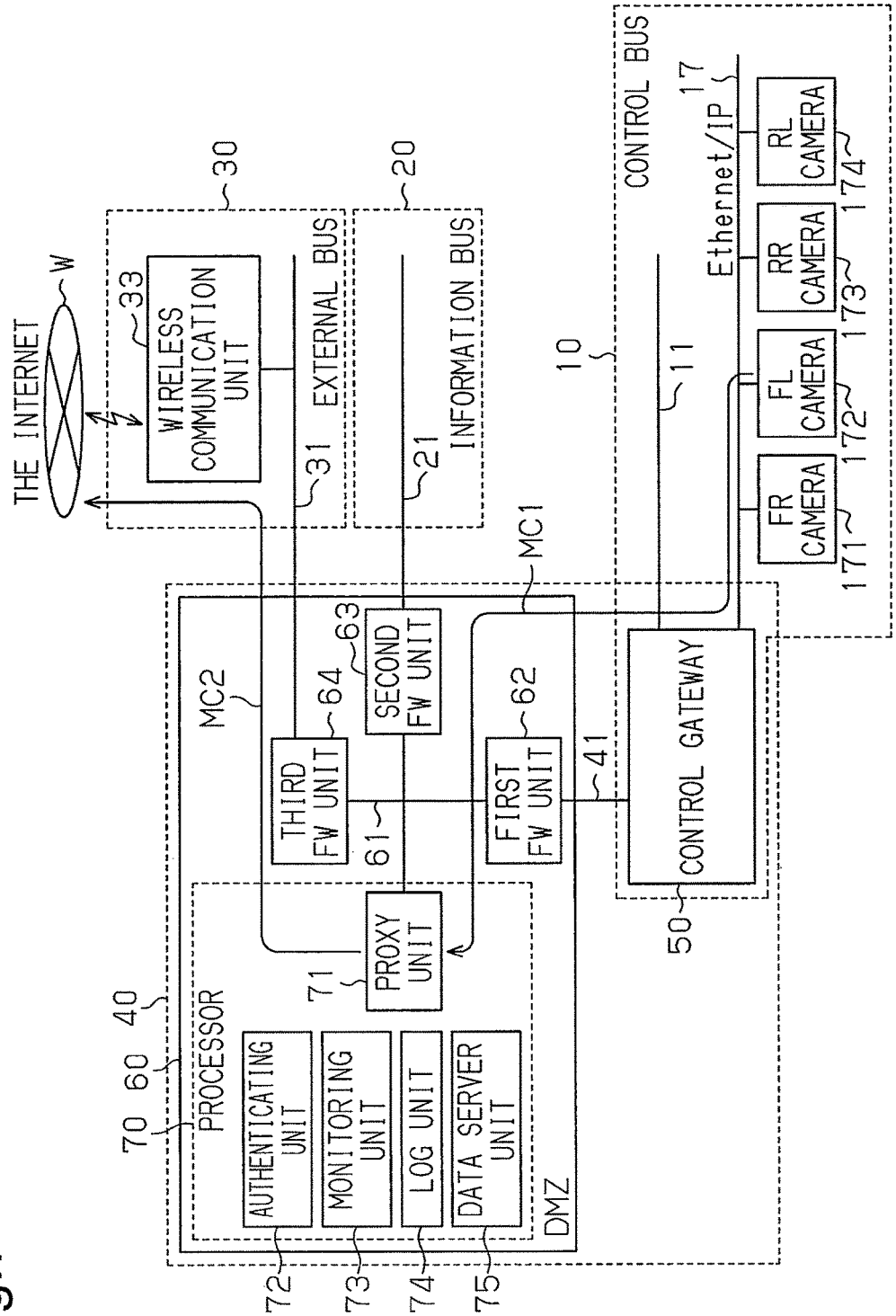
FIG. 7 is an explanatory schematic diagram showing how a plurality of response signals is transmitted from an internal bus to the external bus in the communication system of FIG. 1.

FIG. 7 shows a process of transmitting vehicular information in the control bus 10 successively in response to a request from an external device. Here, it is assumed that the external device has been authenticated by the authentication process shown in FIG. 5 and that a signal successively requesting information has been transmitted to an ECU in the control bus 10 as a transmission destination of the signal successively requesting information by the process shown in FIG. 6.

A communication bus 17 conforming to the Ethernet (registered trademark) standard is further connected to the control gateway 50. Further, four cameras, specifically an FR (front right) camera 171, an FL (front left) camera 172, an RR (rear right) camera 173, and an RL (rear left) camera 174, are connected to the communication bus 17. The cameras 171 to 174 are each a camera to capture an image of an environment outside the vehicle 1. The FR camera 171 captures an image of the front right side of the vehicle 1. The FL camera 172 captures an image of the front left side of the vehicle 1. The RR camera 173 captures an image of the rear right side of the vehicle 1. The RL camera 174 captures an image of the rear left side of the vehicle 1. As an example, the FL camera 172 receives a signal successively requesting information transmitted via the proxy unit 71, the first firewall unit 62, and the control gateway 50. This signal successively requesting information is a request signal successively requesting vehicular information generated by the data server unit 75. As an example, the signal successively requesting information includes a request order requesting images captured by a camera to be transmitted successively at short intervals. The proxy unit 71 memorizes the fact that the signal successively requesting information has been transmitted to the FL camera 172.

Upon receiving the signal successively requesting information, the FL camera 172 periodically generates and transmits a return communication message MC1 including a captured image in response to the request order in the signal successively requesting information. Specifically, the FL camera 172 transmits moving images in real time. The FL camera 172 generates the communication message MC1 in a way that allows the communication message MC1 to be transmitted via the IP (Internet Protocol). The communication message MC1 from the FL camera 172 is transmitted to the first firewall unit 62 via the control gateway 50. The first firewall unit 62 determines whether passage of the communication message MC1 is permitted. If the passage is permitted, the communication message MC1 is transmitted to the proxy unit 71. At this time, the first firewall unit 62 permits passage of the communication message MC1 on condition that the communication message MC1 is a communication message from the control bus 10 to the processor 70. When determining that the communication message MC1 is a message responsive to a communication message of the signal successively requesting information transmitted to the FL camera 172 by the proxy unit 71, the proxy unit 71 processes and/or changes a response signal MC2 resulting from changing information about a transmission destination or a transmission source of the communication message MC1, where necessary. The proxy unit 71 transmits the response signal MC2 after being processed and/or changed to the external device in the external bus 30 via the third firewall unit 64. The third firewall unit 64 determines whether passage of the response signal MC2 is permitted. If the passage is permitted, the response signal MC2 is transmitted to the external bus 30. At this time, the third firewall unit 64 permits passage of the response signal MC2 on condition that the response signal MC2 is a communication message from the processor 70 to the external bus 30. The proxy unit 71 processes a communication message in the aforementioned way. This protects the data server unit 75 from an increase of a processing load due to successively transmitted vehicular information, for example. While vehicular information is transmitted successively, the communication message MC1 from the control bus 10 is changed to the response signal MC2 by the process in the proxy unit 71 and is then output. This allows a response signal to be passed from the processor 70 to the external bus 30 without involving change of the regulatory condition of the third firewall unit 64. Specifically, this does not involve change of the regulatory condition of the third firewall unit 64, for example. Thus, the security of the control bus 10 and that of the information bus 20 against the external bus 30 are maintained at a high level.

Figure 8:
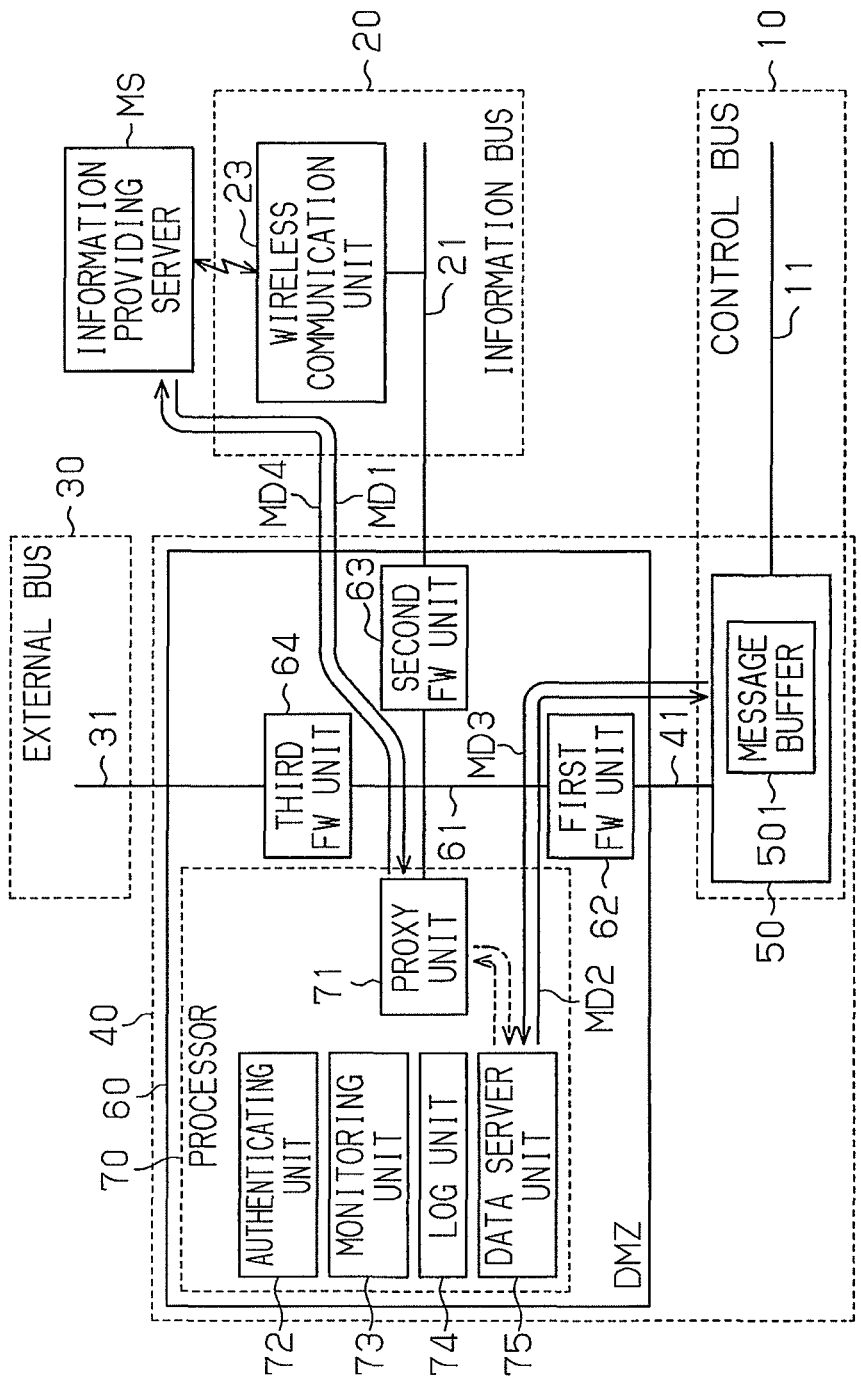
FIG. 8 is an explanatory schematic diagram showing how a request signal is transmitted from the information bus to the internal bus in the communication system of FIG. 1.

FIG. 8 shows a process of transmitting vehicular information as control information in the control bus 10 in response to a request from an information providing server MS in the information bus 20. Here, it is assumed that the information providing server MS has been authenticated by the authentication process illustrated in FIG. 5.

The vehicle 1 is connected to the information providing server MS such as a navigation system via a wireless communication unit 23 in the information bus 20. The vehicle 1 receives from the information providing server MS a request signal MD1 requesting vehicular information in the control bus 10. The second firewall unit 63 determines whether passage of the request signal MD1 is permitted. If the passage is permitted, the request signal MD1 is transmitted to the proxy unit 71. The information providing server MS has been authenticated. Thus, the proxy unit 71 changes a transmission destination of the request signal MD1 to the data server unit 75. Specifically, the proxy unit 71 requests the data server unit 75 to process the request signal MD1. The data server unit 75 analyzes the request signal MD1 transmitted from the proxy unit 71. The request signal MD1 having passed via the information bus 20 is generally to be transmitted to the information providing server MS of a manufacturer, so that the security of the request signal MD1 is considered to be higher than that of the Internet. Thus, the security of the request signal MD1 is considered to be higher than that of a message via the Internet.

The data server unit 75 transmits to the control bus 10 via the proxy unit 71 and the first firewall unit 62 a communication message MD2 intended to acquire vehicular information based on the request signal MD1. The control gateway 50 in the control bus 10 acquires the communication message MD2 from the message buffer 501 and generates a return communication message MD3 containing the vehicular information requested in the communication message MD2. The control gateway 50 transmits the communication message MD3 to the data server unit 75 via the first firewall unit 62 and the proxy unit 71. The data server unit 75 generates a response signal MD4 containing the vehicular information acquired from the communication message MD3 and transmits the response signal MD4 to the information bus 20 via the proxy unit 71. The response signal MD4 is a message responsive to the request signal MD1, meaning that the request signal MD1 has requested the vehicular information in the response signal MD4.

The security of the request signal MD1 input from the information bus 20 is maintained at a relatively high level. Thus, the log unit 74 of this embodiment does not acquire log data about the request signal MD1. However, the log unit 74 may acquire log data about the request signal MD1, analyze the acquired log data, or deliver the log data to a log analyzer.

Figure 9:
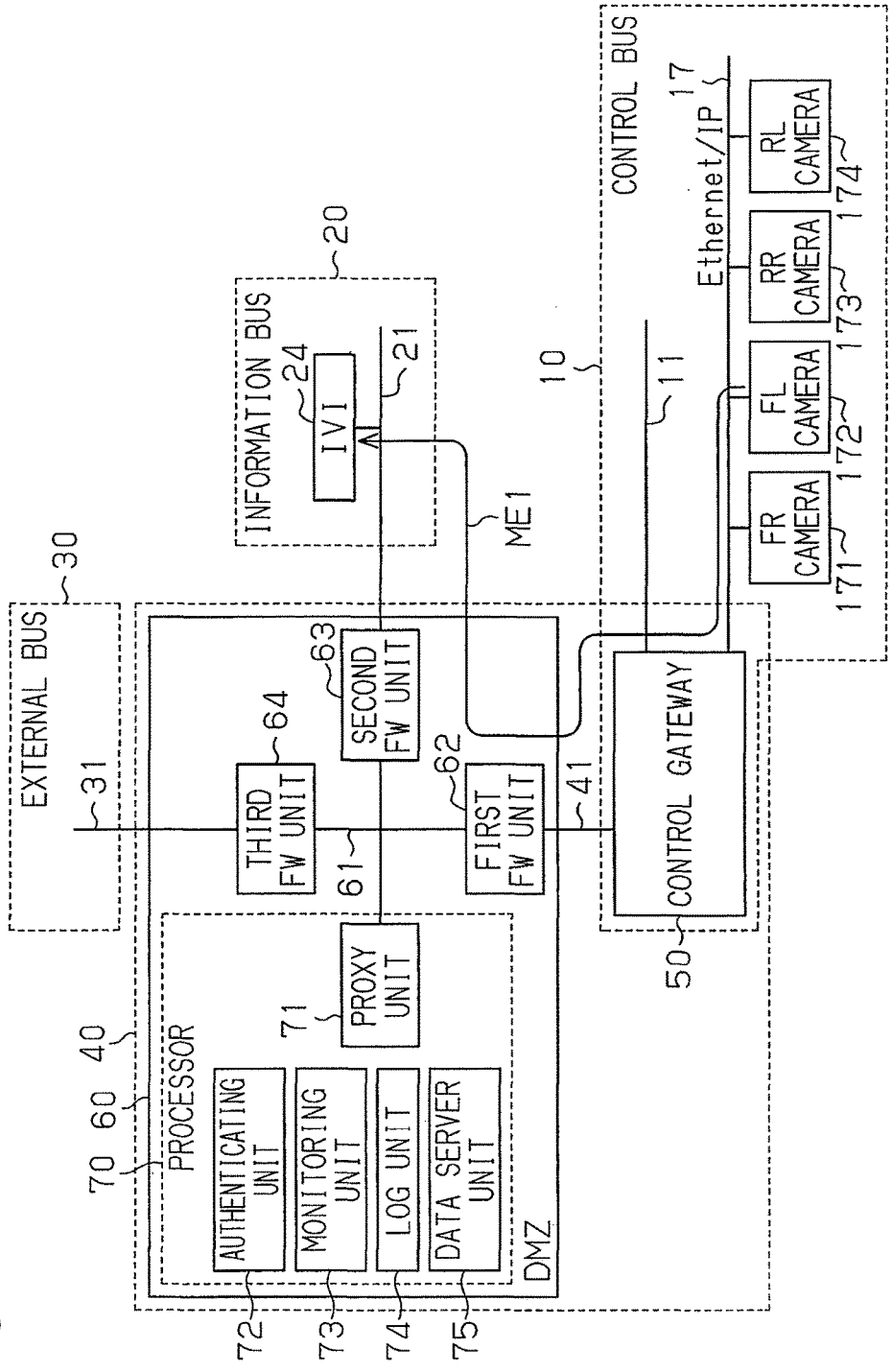
FIG. 9 is an explanatory schematic diagram showing how a plurality of response signals is transmitted from the internal bus to the information bus in the communication system of FIG. 1.

FIG. 9 shows a process of transmitting vehicular information in the control bus 10 successively in response to a request from an external device. Here, it is assumed that a next-generation in-vehicle information communication system (IVI: in-vehicle infotainment) 24 in the information bus 20 has been authenticated. The in-vehicle infotainment 24 is an information providing device mounted on the vehicle 1 and provides a wide range of functions including a telephone function, a navigation function, an audio function, and a function of connecting and/or searching on the Internet. As shown in FIG. 7, the four cameras, specifically the FR camera 171, the FL camera 172, the RR camera 173, and the RL camera 174 are connected to the communication bus 17 in the control gateway 50 conforming to the Ethernet (registered trademark) standard.

A signal successively requesting information from the information bus 20 has been transmitted to the FL camera 172 in the control bus 10 by following the way illustrated in FIG. 6. Specifically, a communication message generated by the data server unit 75 in response to a communication message from the in-vehicle infotainment 24 has been transmitted to the FL camera 172 via the proxy unit 71, the first firewall unit 62, and the control gateway 50. The FL camera 172 continues transmitting captured images at short intervals in response to the signal successively requesting information. The proxy unit 71 memorizes the fact that the communication message successively requesting vehicular information has been transmitted to the FL camera 172. Further, in response to transmission of this communication message, the proxy unit 71 changes the regulatory condition of the second firewall unit 63 such that passage of a communication message from the control bus 10 to the information bus 20 is permitted. The security of the control bus 10 is higher than that of the information bus 20. Hence, this change of the regulatory condition of the second firewall unit 63 is free from the fear of reduction of the security level of the information bus 20.

In response to the communication message successively requesting vehicular information, the FL camera 172 periodically generates and transmits a response signal ME1 as a responsive communication message containing captured images. The FL camera 172 generates the response signal ME1 in a way that allows the response signal ME1 to be transmitted via the Internet Protocol. The response signal ME1 from the FL camera 172 is passed to the first firewall unit 62 via the control gateway 50, and the first firewall unit 62 permits passage of the response signal ME1. The response signal ME1 having passed through the first firewall unit 62 is transmitted through the internal bus 61 to the proxy unit 71 and the second firewall unit 63. The second firewall unit 63 permits passage of the received response signal ME1, so that the response signal ME1 is transmitted to the information bus 20. The response signal ME1 is input via the information bus 20 to the in-vehicle infotainment 24 as a transmission source of the request signal. The response signal ME1 is transmitted from the second firewall unit 63 directly to the information bus 20, so that the proxy unit 71 does not process the response signal ME1.

Thus, the processing load of the data server unit 75 and the proxy unit 71 is prevented from being increased by process on the response signal ME1 transmitted successively from the control bus 10. The response signal ME1 from the control bus 10 is only permitted to be transmitted to the information bus 20. Specifically, no change is made in a regulatory condition forming the regulatory condition of the second firewall unit 63 and relating to a request signal to be input and in the regulatory condition of the third firewall unit 64. Thus, the security of the control bus 10 and that of the information bus 20 against the external bus 30 are ensured.

As described above, the communication system including the information processing device of this embodiment achieves the advantages listed below.

(1) The control bus 10 is isolated from the external bus 30 connected for example to the Internet or an information terminal. The control bus 10 is further isolated from the information bus 20 connected to an information device such as a navigation system or an audio system. This ensures the security of the control bus 10 favorably to and from which vehicular information important for travel of the vehicle 1, specifically control information, is transferred.

The processor 70 is connected to the control bus 10, the information bus 20, or the external bus 30 via the first, second or third firewall unit 62, 63 or 64. Thus, information in the control bus 10 can be transmitted to the information bus 20 and the external bus 30 via the processor 70 while the control bus 10 is not accessed directly from the information bus 20 and the external bus 30.

This ensures the security of the control bus 10 favorably against the external bus 30 for example while allowing the control bus 10 and the information bus 20 to communicate with each other and the control bus 10 and the external bus 30 to communicate with each other.

The processor 70 intervenes in acquisition of information from the control bus 10. Thus, even a request signal not conforming to the protocol of the control bus 10 still allows the external bus 30 to acquire information in the control bus 10.

The vehicle 1 is generally provided with at least three networks differing in required security levels from each other, specifically the control bus 10, the information bus 20, and the external bus 30. Specifically, the vehicle 1 is provided with the control bus 10 required to be at a high security level, the information bus 20 of a security level not required to be as high as that of the control bus 10, and the external bus 30 finding difficulty in ensuring its security. In this embodiment, different firewalls are prepared for these units, so that a security level that should be ensured in each bus can be determined appropriately.

(2) A request signal received from the external bus 30 or the information bus 20 does not flow into the control bus 10 directly but it is processed in a predetermined way by the processor 70. This favorably maintains the security at least of the control bus 10. In the vehicle 1, the processor 70 acquires vehicular information such as vehicle speed information or sensor information in the control bus 10 based on a received request signal, and generates a response signal responsive to the request signal and containing the vehicular information. Thus, even if a request signal from a different network does not flow into the control network, information requested in the request signal is still transmitted in a response signal to a transmission source of the request signal in the different network.

A request signal received for example from the external bus 30 is processed by the processor 70. This does not require the request signal to conform to the protocol of the control bus 10 for example in the external bus 30. Thus, the external bus 30 and the information bus 20 can acquire vehicular information in the control bus 10 easily.

(3) Vehicular information is acquired from the control bus 10. Each time a request signal is received from the external bus 30, for example, vehicular information is acquired from the control bus 10. Hence, it is therefore possible to increase the real-time correspondence of the vehicle information to the received request signal.

(4) Vehicular information is acquired from the storage of the data server unit 75. A response signal responsive to a request signal received from the external network or the information network is generated based on control information acquired from the control network and stored in the storage. This shortens the time to elapse before a response signal generated in response to a received request signal is transmitted, thereby enhancing the responsiveness of the response signal to the request signal.

(5) A request signal for example from the external bus 30 once enters the proxy unit 71. This can keep information about a transmission destination in the control bus 10 hidden from the external bus 30. As a result, the security of the control bus 10 can be ensured at a higher level.

The data server unit 75 is responsible for process on a request signal. Thus, even if a request signal for example from the external bus 30 is not transmitted to the control bus 10, a response signal responsive to the request signal can be generated. This also maintains the control bus 10 at a high level of security.

(6) The processor 70 performs a process of acquiring vehicular information in response only to a request signal transmitted from an authenticated external device. Thus, vehicular information in the control bus 10 is prevented from being acquired improperly by an unauthenticated external device, for example. This can also maintain the control bus 10 at a high level of security.

(7) Acquisition of vehicular information is prohibited based on a request signal determined to develop an abnormality as a result of monitoring. This also contributes to enhancement of the security of the control bus 10.

(8) A request signal is stored as log data chronologically or statistically. Thus, the presence or absence of an abnormal request signal caused for example by attack from the external bus 30 can be determined. This can manage the communication system favorably mounted on the vehicle 1 while contributing to further enhancement of the security of the control bus 10.

(9) The processor 70 can appropriately handle the case where a request signal from the external bus 30 requests a plurality of successive pieces of vehicular information, for example. Specifically, the processor 70 can generate a response signal responsive to a request signal while incorporating a plurality of pieces of vehicular information in order in the response signal stored chronologically in the data server unit 75 functioning as a storage as occasion arises. The processor 70 may also generate a response signal containing pieces of vehicular information composed for example of pieces of information appearing at short intervals or divided pieces of information that are stored in the order in which they are acquired from the control bus 10. This can respond to a request for acquisition of a plurality of pieces of vehicular information while the control bus 10 is maintained at a high level of security.

(10) The communication protocol of the control bus 10 of a vehicle is CAN and this differs from the Internet Protocol used as the communication protocol of the external bus 30. Hence, the protocol converters 511 to 514 are arranged not on the side of the first firewall unit 62 but in the control bus 10. While the communication protocol of the control bus 10 differs from that of the external bus 30, a request signal input from the external bus 30 and processed by the processor 70 is converted to the communication protocol of the control bus 10. This allows the external bus 30 and the control bus 10 to transmit information to and from each other appropriately.

(11) A response signal generated by incorporating control information acquired from the control bus 10 is transferred to an authenticated transmission source in the information bus 20. This can reduce a processing load on the processor 70 while allowing the information providing server MS as a device in the information bus 20 to acquire vehicular information in the control bus 10 easily and promptly.

Other Embodiments

The aforementioned embodiment may be modified as follows.

In the aforementioned embodiment, a plurality of ECUs is connected to the control bus 10 and the information bus 20. This is not the only example. It is sufficient to connect one or more ECUs to each bus. This contributes to expansion of an applicable range of the communication system including the information processing device.

In the aforementioned embodiment, an ECU is connected to the control bus 10 and the information bus 20. However, this is not the only example. An information processing unit different from an ECU may be connected to each bus as long as this information processing unit can communicate with each bus through a communication bus. This contributes to expansion of an applicable range of the communication system including the information processing device.

In the aforementioned embodiment, the control bus 10 includes a CAN bus, a local interconnect network bus, and an Ethernet (registered trademark) bus. However, this is not the only example. The control bus may include a communication standard such as that of FlexRay (registered trademark) different from a CAN bus, a local interconnect network bus, and an Ethernet (registered trademark) bus. It is sufficient to provide at least one of a CAN bus, a local interconnect network bus, an Ethernet (registered trademark) bus, and a bus different from the former buses in the control bus. This contributes to expansion of an applicable range of the communication system including the information processing device.

In the aforementioned embodiment, a plurality of communication buses (including buses 11 to 16 and 17) are provided in the control bus 10. However, this is not the only example. It is sufficient to provide at least one communication bus in the control bus. This contributes to expansion of an applicable range of the communication system including the information processing device.

In the aforementioned embodiment, the control gateway 50 includes the power train gateway 51, the chassis gateway 52, the safety gateway 53, and the vehicle body gateway 54. However, this is not the only example. The control gateway may include at least one of the power train gateway, the chassis gateway, the safety gateway, and the vehicle body gateway. This contributes to expansion of an applicable range of the communication system including the information processing device.

In the aforementioned embodiment, the control gateway 50 includes the power train gateway 51, the chassis gateway 52, the safety gateway 53, and the vehicle, body gateway 54 that are provided separately. However, this is not the only example. The control gateway may include an integral structure of two or more of the power train gateway, the chassis gateway, the safety gateway, and the vehicle body gateway. This contributes to enhancement of design flexibility of the communication system including the information processing device.

In the aforementioned embodiment, the demilitarized zone 60 and the control gateway 50 are shown to be provided integrally in the central gateway 40. In this case, if the functions of the demilitarized zone 60 and the control gateway 50 are allocated to a processor in the central gateway 40 and all buses are logically isolated by means of software, for example, change in any function necessitates a task such as design change or update of the software involving the entire central gateway 40. Hence, the demilitarized zone and the control gateway may be arranged separately.

Figure 10:
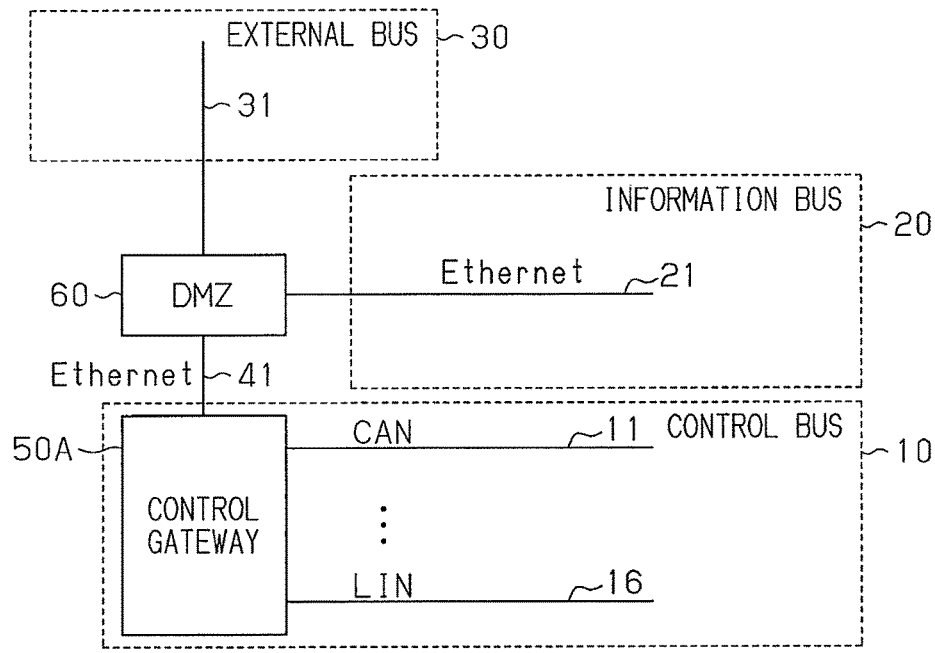
FIG. 10 is a block diagram schematically showing another embodiment of an information processing device and the structure of a communication system including the information processing device.

The demilitarized zone 60 and a control gateway 50A may be provided separately as shown in FIG. 10, for example. The control gateway 50A has a structure where four gateways including a power train gateway, a chassis gateway, a safety gateway, and a vehicle body gateway are integrated. Specifically, a processor to realize the function of the demilitarized zone 60 and a processor to realize the function of the control gateway 50A may be isolated physically. This only necessitates a task such as design change or update of software involving a processor subjected to change in its function, thereby contributing to enhancement of design flexibility of the communication system including the information processing device.

Figure 11:
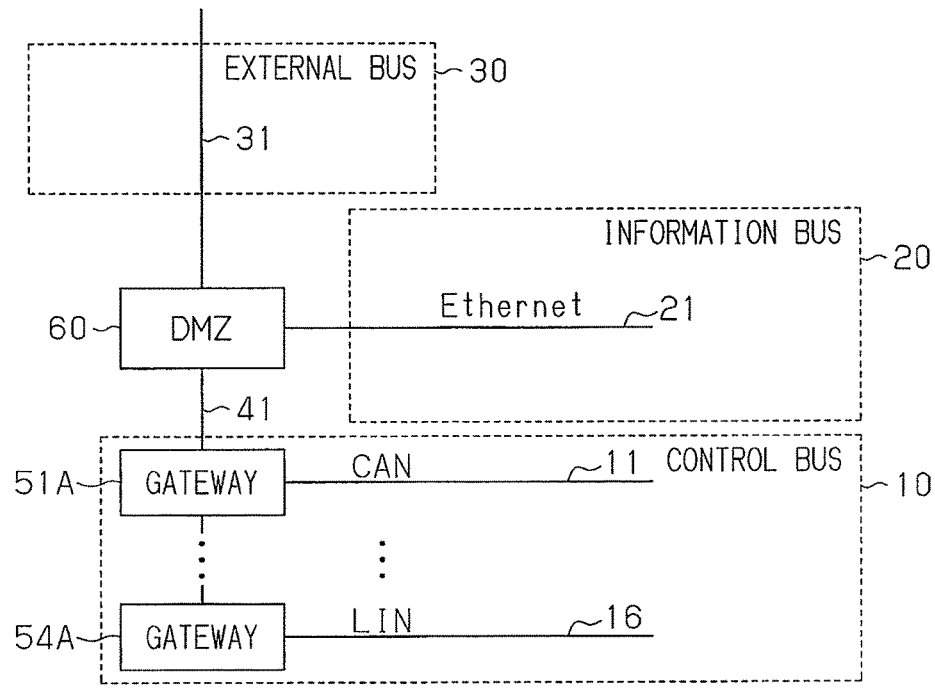
FIG. 11 is a block diagram schematically showing still another embodiment of an information processing device and the structure of a communication system including the information processing device.

As further shown in FIG. 11, the control bus 10 may include gateway (switches) 51A to 54A composed of different processors provided on respective communication buses. In this case, change in specifications occurring in one communication bus can be handled only by changing the design of a corresponding gateway (switch), for example. This contributes to enhancement of design flexibility or expansion of an applicable range of the communication system including the information processing device.

In the aforementioned embodiment, the control gateway 50 includes the message buffer 501. However, this is not the only example. The control gateway does not necessarily need to include any message buffer. Gateways on communication buses may include respective message buffers. Each time transfer of vehicular information becomes necessary between communication buses, the vehicular information may be transmitted from a target ECU. This contributes to enhancement of design flexibility or expansion of an applicable range of the communication system including the information processing device.

In the aforementioned embodiment, vehicular information in the control bus 10 is shown to be acquired from an ECU in the control bus 10 or from the message buffer 501 in the control gateway 50. Vehicular information acquired from an ECU is expected to be the latest information, and vehicular information acquired from the message buffer 501 is expected to achieve prompt response. However, this is not the only example. Vehicular information in the control bus may be acquired only from an ECU in the control bus or from the message buffer in the control gateway. In either case, a significant difference is not generated in process performed by a processor relating to acquisition of vehicular information. Thus, the processor can respond to both of the cases favorably.

In the aforementioned embodiment, vehicular information in the control bus 10 is acquired by the information bus 20. However, this is not the only example. The information bus may set a parameter for an ECU in the control bus. The on-board information bus is generally maintained at a security level higher than that of the external bus. Specifically, the security of the information bus is maintained at a certain level. This allows the information bus to transmit setting data used for data setting to a control device in the control bus. Even if the information bus is allowed to set a parameter for an ECU in the control bus, the security of the control bus is still generally maintained at an appropriate level. As a result, a control device connected to the control bus can be managed easily while the security of the control bus against the external bus is maintained.

In the aforementioned embodiment, successive pieces of vehicular information are camera images, specifically moving images. However, this is not the only example. Successive pieces of vehicular information may be a plurality of segments of large-volume data. This contributes to expansion of an applicable range of the information processing device.

In the aforementioned embodiment, the log unit 74 is shown to be allowed to both analyze log data and transmit the log data to an external log analyzer. Specifically, the log unit may only analyze log data or transmit the log data to an external log analyzer. The log unit may perform both analysis and transmission of log data to a log analyzer. In any case, the presence or absence of an abnormality in a request signal is analyzed in an ex-post manner based on log data. This contributes to enhancement of design flexibility of the information processing device.

In the aforementioned embodiment, the log unit 74 or a log analyzer analyzes log data in an ex-post manner. However, this is not the only example. The log unit or a log analyzer may analyze log data in real time. This contributes to enhancement of responsiveness of the information processing device to an abnormal communication message.

In the aforementioned embodiment, the processor 70 includes the authenticating unit 72, the monitoring unit 73, and the log unit 74. However, this is not the only example. All of or some of the authenticating unit, the monitoring unit, and the log unit may be omitted from the processor. This contributes to enhancement of design flexibility of the information processing device.

In the aforementioned embodiment, the authenticating unit 72 authenticates an external device when communication is started with the external device, for example. However, this is not the only example. When a signal requesting vehicular information is received from the external device, the authenticating unit may start authentication process based on the received request signal. As an example, the authenticating unit may start authentication process upon receipt of a signal requesting vehicular information and may ask the external device for information necessary for the authentication. If a signal requesting vehicular information is given data for authentication, the authenticating unit may perform an authentication process on the signal requesting vehicular information. This contributes to expansion of an applicable range of the information processing device.

In the aforementioned embodiment, the proxy unit 71 updates information in the proxy unit 71 about an improper transmission source based on a result of authentication by the authenticating unit 72 or a result of monitoring by the monitoring unit 73. However, this is not the only example. Information in the proxy unit about an improper transmission source may be updated by the authenticating unit 72 based on a result of authentication by the authenticating unit 72 itself or by the monitoring unit based on a result of monitoring by the monitoring unit itself. This contributes to enhancement of design flexibility of the information processing device.

In the aforementioned embodiment, the processor 70 includes the proxy unit 71 and the data server unit 75 that are provided separately. However, this is not the only example. The proxy unit and the data server unit may be configured integrally as long as their functions are achieved by this configuration. This contributes to enhancement of design flexibility of the information processing device.

In the aforementioned embodiment, regulatory conditions of the first to third firewall units 62 to 64 are determined based on the address of a transmission source or a transmission destination. However, this is not the only example. A regulatory condition of each firewall unit may be determined based not on the address of a transmission source or a transmission destination but on the contents of a communication message or it may also be determined based on the address of a transmission source or a transmission destination and on the contents of a communication message. This enhances flexibility in determining communication regulation of a firewall, so that entry of an improper communication message into the demilitarized zone can be prevented more favorably.

In the aforementioned embodiment, the demilitarized zone 60 includes three firewall units including the first to third firewall units 62 to 64. However, this is not the only example. Firewalls provided in the demilitarized zone may be configured to be separated based on corresponding networks or to be provided integrally relative to three networks, as long as their functions are achieved by this configuration. This contributes to enhancement of design flexibility of the information processing device.

In the aforementioned embodiment, the demilitarized zone 60 includes the first to third firewall units 62 to 64 and the processor 70 that are provided separately. However, this is not the only example. The firewall units and the processor may be configured integrally as long as this configuration achieves the respective functions of the firewall units and the processor. This contributes to enhancement of design flexibility of the information processing device.

In the aforementioned embodiment, vehicular information is acquired from the control bus 10. However, this is not the only example. Information irrelevant to control of a vehicle, specifically control information except vehicular information may be acquired from the control bus. This contributes to expansion of an applicable range of the information processing device.

In the aforementioned embodiment, bus networks such as the control bus 10, the information bus 20, and the external bus 30 form corresponding networks. However, this is not the only example. Each network may be a star network or a ring network. This contributes to expansion of an applicable range of the communication system including the information processing device.

In the aforementioned embodiment, the information bus 20 and the external bus 30 conform to the Ethernet (registered trademark) standard. However, this is not the only example. The information bus and the external bus may conform to a communication standard such as that of CAN, a local interconnect network or FlexRay except the Ethernet (registered trademark) standard. This contributes to expansion of an applicable range of the communication system including the information processing device.

In the aforementioned embodiment, three buses are connected to the demilitarized zone 60. However, this is not the only example. Four or more buses may be connected to the demilitarized zone. This contributes to expansion of an applicable range of the information processing device.

The aforementioned embodiment is mainly intended to ensure the security of the control bus 10. However, this is not the only example. The security of the information bus is ensured in the same way. As a result, the information processing device favorably maintains the security of the information bus of a vehicle.

The vehicle 1 is an automobile in the aforementioned embodiment. However, this is not the only example. The information processing device may be provided in a mobile object other than an automobile such as a ship, a railway car, an industrial machine, or a robot. This contributes to expansion of an applicable range of the communication system including the information processing device.

DESCRIPTION OF THE REFERENCE NUMERALS

1 Vehicle
10 Control bus
11 to 14 First to fourth CAN buses
16 Local interconnect network bus
17 Communication bus
20 Information bus
21 Communication bus
23 Wireless communication unit
24 Next-generation in-vehicle information communication system (IVI)
30 External bus
31 Communication bus
32 Data link connector (DLC)
33 Wireless communication unit
40 Central gateway
41 Communication bus
50, 50A Control gateways
51 Power train gateway
52 Chassis gateway
53 Safety gateway
54 Vehicle body gateway
51A to 54A Gateways
60 Demilitarized zone (DMZ)
61 Internal bus
62 to 64 First to third firewall (FW) units
70 Processor
71 Proxy unit
72 Authenticating unit
73 Monitoring unit
74 Log unit
75 Data server unit
111 to 113, 131, 132, 141, 142, 161 Electronic control units (ECUs)
171 FR camera
172 FL camera
173 RR camera
174 RL camera
211, 213, 214 ECUs
212 Ethernet switch
501 Message buffer
511 to 514 Protocol converters
W the Internet
MS Information providing server

The invention claimed is:

1. An information processing device connected to a plurality of networks including a control network connected to a control device in a mobile object, an information network connected to an information device in the mobile object, and an external network connected to an external device outside of the mobile object, the information processing device comprising:

firewalls each connected to one of the networks, and
a processor connected to each of the networks via the corresponding firewall, wherein
the information processing device is configured to isolate at least the control network from the other networks,
each of the firewalls is configured to permit communication only between the processor and the respective one of the networks to which the respective firewall is connected,
the processor includes:
a proxy server that is configured to:
receive, from a network other than the control network, a request signal that requests control information about the control device,
change a transmission destination of the received request signal to the data server, according to the contents of the received request signal, and
transmit the received request signal to the data server, according to the contents of the received request signal; and
a data server that is configured to:
acquire from the control network or a storage that stores control information from the control network, the control information requested in the received request signal,
generate a response signal responsive to the request signal, the response signal responsive to the request signal containing the acquired control information, and transmit the generated response signal responsive to the request signal to the network that is the transmission source of the request signal.

2. The information processing device according to claim 1, wherein the processor is further configured to:
authenticate the device that transmitted the request signal received by the proxy server, and
acquire the requested control information in the received request signal, if the device that transmitted the request signal received by the proxy server has been authenticated.

3. The information processing device according to claim 1, wherein the processor is further configured to:
monitor the request signal received by the proxy server based on a monitoring condition, and
upon the determination that an abnormality has occurred in the request signal as a result of the monitoring based on the monitoring condition, prohibit the data server from acquiring the control information.

4. The information processing device according to claim 1, wherein the processor is configured to store received request signals chronologically.

5. The information processing device according to claim 1, wherein
the request signal is a request signal requesting acquisition of a plurality of pieces of control information, and
the data server is configured to:
acquire the pieces of control information requested in the request signal one by one successively from the control network, and
repeat generation of the response signal while incorporating the acquired pieces of control information in order in the response signal.

6. The information processing device according to claim 1, wherein a controller is provided between the control network and the firewall connected to the control network, and the controller is configured to convert a communication protocol of the request signal processed by the processor to a communication protocol of the control network.

7. The information processing device according to claim 1, wherein
the processor is configured to receive, from the information network, setting data relating to setting of a device in the control network, and
the data server is configured to generate, based on the received setting data, a transmission signal to be transmitted to the control network.

8. The information processing device according to claim 1, wherein
the processor is configured to authenticate a transmission source of a request signal received from the information network, and
the data server is configured to:
transfer the generated response signal to the authenticated transmission source in the information network.

9. The information processing device according to claim 1, wherein, in order to isolate the control network from the other networks, the processor is configured to permit passage of communication messages between the processor and the control network while prohibiting flow of communication messages from the other networks into the control network.

10. An information processing method implemented in an information processing device, the information processing device being connected to a plurality of networks including a control network connected to a control device in a mobile object, an information network connected to an information device in the mobile object, and an external network connected to an external device outside of the mobile object, the information processing device including firewalls each connected to one of the networks, a processor connected to each of the networks via the corresponding firewall, the information processing device being configured to isolate at least the control network from the other networks, and each of the firewalls is configured to permit communication only between the processor and the respective one of the networks to which the respective firewall is connected, the method comprising:
receiving, by a proxy server of the processor from a network other than the control network, a request signal that requests control information about the control device,
changing, by the proxy server, a transmission destination of the received request signal to a data server of the processor, according to the contents of the received request signal;
transmitting, by the proxy server, the received request signal to the data server, according to the contents of the received request signal;
acquiring, by the data server, from the control network or a storage that stores control information from the control network, the control information requested in the received request signal;
generating, by the data server, a response signal responsive to the request signal, the response signal responsive to the request signal containing the acquired control information; and
transmitting, by the data server, the generated response signal responsive to the request signal to the network that is the transmission source of the request signal.

11. An information processing method implemented in an information processing device, the information processing device being connected to a plurality of networks including a control network connected to a control device in a mobile object, and another network connected to another device other than the control device, the information processing device including firewalls each connected to one of the networks, a processor connected to each of the networks via the corresponding firewall, the information processing device being configured to permit passage of communication messages between the processor and the control network and prevent flow of communication messages from the other network into the control network, each of the firewalls being configured to permit communication only between the processor and the respective one of the networks to which the respective firewall is connected, the method comprising:
receiving, by a proxy server of the processor from a network other than the control network, a request signal that requests control information about the control device,
changing, by the proxy server, a transmission destination of the received request signal to a data server of the processor, according to the contents of the received request signal;
transmitting, by the proxy server, the received request signal to the data server, according to the contents of the received request signal;
acquiring, by the data server, from the control network or a storage that stores control information from the control network, the control information requested in the received request signal;

generating, by the data server, a response signal responsive to the request signal, the response signal responsive to the request signal containing the acquired control information; and
transmitting, by the data server, the generated response signal responsive to the request signal to the network that is the transmission source of the request signal.

* * * * *